United States Patent [19]

Bens et al.

[11] 4,315,905
[45] Feb. 16, 1982

[54] PROCESS FOR PRODUCING AN ELECTRONICALLY CONDUCTIVE OXIDIZER MATERIAL

[75] Inventors: Everett M. Bens; Aaron N. Fletcher, both of Ridgecrest, Calif.

[73] Assignee: The United States of America as represented by the Secretary of the Navy, Washington, D.C.

[21] Appl. No.: 164,449

[22] Filed: Jun. 30, 1980

[51] Int. Cl.³ ............................................. C01G 31/02
[52] U.S. Cl. ..................................... 423/592; 252/518
[58] Field of Search ........................ 423/592; 252/518

[56] References Cited

U.S. PATENT DOCUMENTS

| | | |
|---|---|---|
| 2,665,970 | 1/1954 | Halpern et al. |
| 2,702,739 | 2/1955 | Kelly ................................... 423/592 |
| 2,776,871 | 1/1957 | Kelly . |
| 3,410,652 | 11/1968 | Hausen et al. ....................... 423/592 |
| 3,483,110 | 12/1969 | Rozgonyi ............................ 423/592 |
| 3,503,902 | 3/1970 | Shimoda ............................. 252/518 |
| 3,557,026 | 1/1971 | Teeg et al. .......................... 423/592 |
| 3,642,432 | 2/1972 | Teeg et al. .......................... 423/592 |
| 3,650,680 | 3/1972 | Teeg et al. |
| 3,684,433 | 8/1972 | Langenhoff et al. |
| 3,932,312 | 1/1976 | Kazmierowicz .................... 252/518 |
| 4,035,476 | 7/1977 | Ilmaier et al. |
| 4,040,808 | 8/1977 | Kahn et al. ......................... 252/518 |
| 4,123,597 | 10/1978 | Zauner et al. |

FOREIGN PATENT DOCUMENTS

| | | | |
|---|---|---|---|
| 43-19209 | 8/1968 | Japan ................................. 423/592 |
| 1168107 | 10/1969 | United Kingdom ................ 423/592 |

*Primary Examiner*—Herbert T. Carter
*Attorney, Agent, or Firm*—Robert F. Beers; W. Thom Skeer

[57] ABSTRACT

A method for preparing an electronically conductive oxidizer by heating vanadium pentoxide and subjecting it to a flowing reducing gas at about 500° C., forming a product which is electronically conductive at temperatures from about 25° C. to above 450° C. and useful as a cathode material in thermal batteries.

4 Claims, No Drawings

PROCESS FOR PRODUCING AN ELECTRONICALLY CONDUCTIVE OXIDIZER MATERIAL

BACKGROUND OF THE INVENTION

1. Field of the Invention:

The present invention relates to a method for reducing vanadium pentoxide into a product which is useful as a cathode, or as a cathode coating, in thermal batteries.

2. Description of the Prior Art:

A previous method for making a thermal battery cathode is to add graphite to an oxidizing material. However, graphite is conductive, replaces the oxidizer, and thus lowers the energy density. Since it is desirable to have an oxidizer which is electrically conductive when used in a thermal battery, the present invention using a reduced vanadium pentoxide as a cathode, or as a cathode coating, is useful and not available in the prior art.

SUMMARY OF THE INVENTION

The present invention produces an electrically conductive oxidizer. It is also a method for its preparation. Vanadium pentoxide, $V_2O_5$, is heated to a temperature in the range from about 400° C. to about 500° C. and then subjected to a flowing gas until there is no further water evolved. The resulting product has a lower oxidation state than vanadium pentoxide and is electrically conductive.

OBJECTS OF THE PRESENT INVENTION

One object of the present invention is to produce an electrically conductive oxidizer which can be used as the cathode, or to coat the cathode, of a thermal battery. When it is used as a coating, it completely covers the cathode and is a conductor of electricity.

Another object is to produce an electrically conductive oxidizer which can be sintered to, or pressed with, vanadium pentoxide to give a product of intermediate electrochemical properties.

These and other objects are achieved as illustrated in detail in the following examples and descriptions, but are not considered to be limiting.

EXAMPLE 1

Vanadium pentoxide, $V_2O_5$, is heated to a temperature in the range from 400° C. to 550° C. The $V_2O_5$ is then treated with a reducing gas at about 500° C., at a flow rate of approximately 10 to 55 milliliters per minute for a time sufficient to partially reduce the $V_2O_5$ and until no further water condenses at room temperature. This time may vary from 2 hours to 10 days depending on the type of reducing gas used and its flow rate.

The following examples relate to variations of example 1.

EXAMPLE 2

When, as in Example 1, the reducing gas is an inert gas, such as helium, flowing at approximately 8.2 milliliters per minute through $V_2O_5$ heated to a temperature from 500° C. to 520° C. for approximately 10 days, the resulting product has a vanadium to oxygen ratio of approximately 1:2.44.

EXAMPLE 3

And when, as in Example 1, a hydrogen bearing gas, such as forming gas, which consists of 6% $H_2$ by volume with 94% $N_2$, flows at a rate from 10 to 20 milliliters per minute through $V_2O_5$ heated to 500° C. for about 9 hours, the resulting product has a vanadium to oxygen ratio of approximately 1:2.45.

EXAMPLE 4

And alternatively, as in Example 1, when forming gas flows through $V_2O_5$ heated to 450° C. at a rate of 50 milliliters per minute for 2 hours, the resulting product has a vanadium to oxygen ratio of approximately 1:2.43.

EXAMPLE 5

And, as in Example 1, when forming gas flows through $V_2O_5$ heated to 500° C. at a rate of 55 milliliters per minute for 30 hours, the resulting product has a vanadium to oxygen ratio of approximately 1:1.80.

EXAMPLE 6

And lastly, as in Example 1, when forming gas flows through $V_2O_5$ heated to a temperature from 420° C. to 495° C. at a rate of 55 milliliters per minute for 21 hours, the resulting product has a vanadium to oxygen ratio of approximately 1:1.85.

The resulting product in the foregoing examples indicates the presence of some $V_6O_{13}$ based upon X-ray diffraction patterns. Furthermore, oxygen uptake data indicates it has a slightly lower oxidation state than $V_2O_5$. This product is reduced $V_2O_5$ and has an electrical conductivity in the range from 0.300 mho to 0.523 mho at 25° C., where mho is the unit representing reciprocal ohms. Since the reduced $V_2O_5$ is an electrically conductive oxidizer, it can be used as either the cathode material, or as a cathode coating, in thermal batteries.

Moreover, this reduced $V_2O_5$ can be sintered to $V_2O_5$ to give a second product which has a conductivity in the intermediate range between a semiconductor and a metallic conductor.

And lastly, when this reduced $V_2O_5$ is pressed with an equal weight of $V_2O_5$, a third product is formed. It has a conductivity of approximately $6.00 \times 10^{-2}$ mho at 25° C. compared to a range from $8.0 \times 10^{-7}$ to $6.0 \times 10^{-6}$ mho at 25° C. for $V_2O_5$ and compared to the conductivity of Examples 5 and 6 which ranges from 0.300 mho to 0.523 mho at 25° C. Products of varying conductivity can be made by pressing varied but known ratios of reduced $V_2O_5$ and $V_2O_5$.

While the foregoing descriptions illustrate methods for preparing an electrically conductive oxidizer for use in a thermal battery, the methods and uses are not limited to the given examples, but only by the claims.

What is claimed is:

1. A method of producing an electrically conductive oxidizer cathode material for use in thermal batteries consisting of:

heating vanadium pentoxide, $V_2O_5$, to a temperature in the range from about 400° C. to about 550° C.;

treating said heated $V_2O_5$ with a reducing gas flowing at a rate from about 8.2 to 55 milliliters per minute for about 2 hours to 10 days until no water condenses at room temperatures reducing said $V_2O_5$ to produce a reduced electrically conductive oxidizer;

recovering said reduced product; and sintering said recovered product to $V_2O_5$.

2. A method as in claim 1 wherein said reducing gas comprises:

hydrogen bearing gas flowing at a rate from about 10 milliliters per minute to about 20 milliliters per minute for about 9 hours through said $V_2O_5$ heated to about 500° C; and reducing said $V_2O_5$ until said resulting electrically conductive oxidizer has a vanadium to oxygen ratio of about 1:2.45.

3. A method as in claim 1 wherein said reducing gas comprises:

helium gas flowing at a rate of about 8.2 milliliters per minute for about 10 days through said $V_2O_5$ heated to a temperature in the range from about 500° C. to about 520° C.; and reducing said $V_2O_5$ until said resulting electrically conducting oxidizer has a vanadium to oxygen ratio of about 1:2.44.

4. A method as in claim 1 wherein said reducing gas consists of:

a mixture of 6% $H_2$ by volume with 94% $N_2$ by volume flowing at a rate of about 55 milliliters per minute for about 21 hours to about 30 hours through said $V_2O_5$ heated to a temperature ranging from about 420° C. to about 500° C.; and reducing said $V_2O_5$ until said resulting electrically conductive oxidizer has a vanadium to oxygen ratio of about 1:1.80 to about 1:1.85.

* * * * *